July 2, 1929.  J. A. HENDLEY  1,719,265
WEATHERSTRIP
Filed April 17, 1928
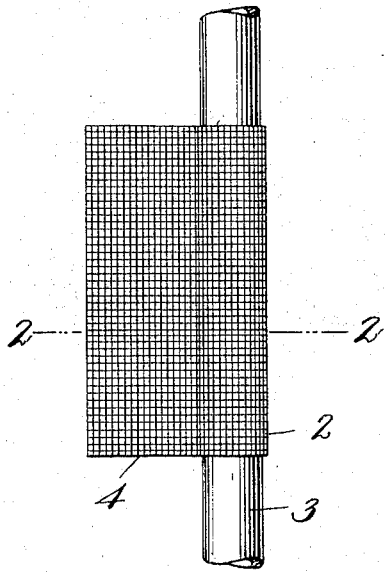
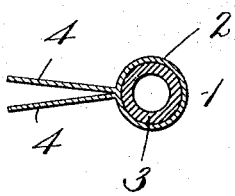
Inventor:
James A. Hendley
by Chas. F. Randall
atty.

Patented July 2, 1929.

1,719,265

UNITED STATES PATENT OFFICE.

JAMES A. HENDLEY, OF MIDDLETOWN, CONNECTICUT, ASSIGNOR TO THE RUSSELL MANUFACTURING COMPANY, OF MIDDLETOWN, CONNECTICUT, A CORPORATION OF CONNECTICUT.

WEATHER STRIP.

Application filed April 17, 1928. Serial No. 270,627.

This invention has relation to weather strips, such as are applied in connection with doors and windows to prevent the intrusion of currents of air around the edges of the doors and windows when the latter are in closed relations.

The invention has for its main object to provide a weather strip of new and improved form and construction rendering it capable of being secured in place at a door or window with the fastenings therefor concealed and protected, as well as conferring upon it various other capabilities.

The invention is an improvement in weather strip of the type comprising a flexible strip having a longitudinally-extending enlargement constituting the most prominent feature of the air-excluding contact-portion of the weather strip, and an attaching web, flange or fin projecting from the enlarged portion. The usual practice in applying weather strip of the said type is to secure it in place by means of fastening means engaging with the said web, flange, or fin. Such fastening means frequently consists of tacks. Usually the fastening means, as for example the tackheads when tacks are employed, remain exposed in full view, and to the action of the atmosphere.

The invention provides a weather strip comprising a longitudinally-extending tubular sheath containing a filler producing an air-excluding contact-portion, and a plurality of longitudinal webs, fins, or flanges projecting from the said sheath in substantially the same direction, contiguous to each other.

An illustrative embodiment of the invention is shown in the accompanying drawings, in which,—

Fig. 1 is a face view of a short section of weather strip constituting the said embodiment.

Fig. 2 is a section on line 2, 2, of Fig. 1.

The invention may be carried into effect by pursuance of various methods of manufacture.

The illustrative embodiment of the invention, shown as aforesaid by the accompanying drawings, is in the form of a strip having along one margin thereof a cylindrical enlargement 1 constituting the air-excluding contact-portion and comprising an enclosing sheath 2 and a filler 3, with two webs, fins, or flanges 4, 4, projecting in one direction from the said cylindrical enlargement.

In the illustrated instance the cylindrical enlargement 1 of the air-excluding contact-portion of the weather strip is produced through the employment of a filler 3 which is enclosed within a covering constituting the said sheath; and the webs, fins, or flanges, are constituted by lateral extensions of the said sheath. Preferably the sheath and webs, fins, or flanges, are made of fibrous material, which preferably is fabricated in seamless form to provide a tubular sheath for occupancy by the filler 3. Preferably, also, the weather strip is produced as a woven or braided article, with the sheath and webs, fins, or flanges, all formed and combined in the process of weaving or braiding as the case may be, and with the filler 3 incorporated within the sheath in the said process. The drawings indicate the use in the contact-portion of the weather strip of a filler 3 composed of rubber tubing. Variations may be made in different respects in the matter of these particulars. Thus some other filler may be used, the article may be fabricated otherwise than by the process of weaving or braiding, and the sheath and webs, fins, or flanges may be composed of other material than fibrous material. The size of the webs, fins, or flanges may vary in practice, in respect of thickness and/or width, and of one web, fin, or flange, with relation to the other. In Fig. 2 they are shown as of equal width. The number of webs, fins, or flanges may vary from that shown, according to the requirements to be met in practice.

I have more particularly in view the mode of attachment consisting in driving tacks or other fastenings through one of the webs, fins, or flanges, while the other thereof is turned out of the way, and then restoring the latter web, fin, or flange, to a position in which it will serve as a finishing strip covering and concealing the heads or other portions of said fastenings appearing at the face of the web, fin, or flange, through which they have been driven; after which it may be cemented or otherwise held in place.

What is claimed as the invention is:—

1. A weather strip comprising a tube containing a filler and constituting a longitudinally-extending enlarged contact-portion, and a plurality of strips projecting laterally from said tube contiguous to each other adopting one of said strips to receive attaching fastenings and the other to constitute a covering for such fastenings.

2. A weather strip comprising in combination, a seamless fabric tube, means for maintaining said tube in distended relation, an attaching strip formed integrally with said tube on a line running the length of said tube, and a finishing strip also integrally formed and adapted to cover said attaching strip.

JAMES A. HENDLEY.